United States Patent
Shukla et al.

(10) Patent No.: US 9,781,032 B1
(45) Date of Patent: *Oct. 3, 2017

(54) MPLS LABEL USAGE IN ETHERNET VIRTUAL PRIVATE NETWORKS

(71) Applicant: Juniper Networks, Inc., Sunnyvale, CA (US)

(72) Inventors: Pankaj Shukla, San Jose, CA (US); Wen Lin, Andover, MA (US); Satya Ranjan Mohanty, Sunnyvale, CA (US); John E. Drake, Pittsburgh, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/207,316

(22) Filed: Jul. 11, 2016

Related U.S. Application Data

(63) Continuation of application No. 14/019,387, filed on Sep. 5, 2013, now Pat. No. 9,391,885.

(51) Int. Cl.
*H04L 12/723* (2013.01)
*H04L 12/721* (2013.01)

(52) U.S. Cl.
CPC .............. *H04L 45/66* (2013.01); *H04L 45/50* (2013.01)

(58) Field of Classification Search
None
See application file for complete search history.

(56) References Cited

U.S. PATENT DOCUMENTS

| | | |
|---|---|---|
| 8,125,926 B1 | 2/2012 | Kompella |
| 8,593,973 B2 | 11/2013 | Shukla et al. |
| 8,644,134 B2 | 2/2014 | Sajassi et al. |
| 8,811,181 B2 | 8/2014 | Osswald |
| 8,953,590 B1 | 2/2015 | Aggarwal et al. |
| 9,019,814 B1 | 4/2015 | Mohanty et al. |
| 9,178,816 B1 | 11/2015 | Ojha et al. |

(Continued)

OTHER PUBLICATIONS

Aggarwal et al, "BGP MPLS Based Ethernet VPN," Network Working Group Internet Draft, draft-raggarwa- D sajassi-l2vpn-evpn-04, Sep. 12, 2011, 42 pp.

(Continued)

*Primary Examiner* — Gregory Sefcheck
*Assistant Examiner* — Jenkey Van
(74) *Attorney, Agent, or Firm* — Shumaker & Sieffert, P.A.

(57) ABSTRACT

In general, techniques are described for configuring a provider edge (PE) network device of an Ethernet virtual private network (EVPN) to use a common traffic engineering label (e.g., MPLS label) for different EVPN route types associated with the same EVPN. In some examples, the techniques include sending a first layer three (L3) control plane message that indicates a label-switched network protocol label that corresponds to a first EVPN route type, wherein the first L3 control plane message indicates that a first PE network device is reachable in the L2 segment. The techniques may include performing L2 address learning to determine at least one L2 address associated with the layer two segment of the EVPN. The techniques may include sending a second L3 control plane message that indicates the same label included in the first L3 control plane message corresponds to a second EVPN route type.

3 Claims, 5 Drawing Sheets

(56) References Cited

U.S. PATENT DOCUMENTS

| | | |
|---|---|---|
| 9,391,885 B1 | 7/2016 | Shukla et al. |
| 9,397,931 B1 | 7/2016 | Mohanty et al. |
| 2003/0118019 A1 | 6/2003 | Mark |
| 2003/0156541 A1 | 8/2003 | Haihong |
| 2011/0286452 A1 | 11/2011 | Balus et al. |
| 2012/0147737 A1 | 6/2012 | Taylor et al. |
| 2012/0236750 A1 | 9/2012 | Bugenhagen et al. |
| 2013/0235876 A1 | 9/2013 | Sajassi et al. |
| 2013/0254359 A1 | 9/2013 | Boutros et al. |
| 2013/0301472 A1* | 11/2013 | Allan ............ H04L 45/66 370/254 |
| 2013/0308646 A1 | 11/2013 | Sajassi et al. |
| 2014/0029419 A1 | 1/2014 | Jain et al. |
| 2014/0241247 A1 | 8/2014 | Kempf et al. |

OTHER PUBLICATIONS

Rosen et al, "BGP/MPLS VPNs," RFC 2547, Network Working Group, The Internet Society, Mar. 1999, 25 pp.

Sajassi et al, "BGP MPLS Based Ethernet VPN," Network Working Group Internet Draft, draft-ieff-l2vpn-evpn-01, D Jul. 14, 2012, 43 pp.

Prosecution History from U.S. Appl. No. 14/019,387, dated Nov. 25, 2013 through Mar. 15, 2016, 55 pp.

\* cited by examiner

MPLS LABEL USAGE IN ETHERNET VIRTUAL PRIVATE NETWORKS

This application is a continuation of U.S. application Ser. No. 14/019,387 filed Sep. 5, 2013, the entire contents of which are incorporated by reference herein.

TECHNICAL FIELD

The disclosure relates to computer networks and, more particularly, to routing packets within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via traffic engineered label switched paths (LSP) through the intermediate network in accordance with one or more multiprotocol label switching (MPLS) protocols. In a typical configuration, provider edge (PE) network devices (e.g., routers and/or switches) coupled to the customer edge (CE) network devices of the customer networks define label switched paths (LSPs) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

As the PE network devices in an EVPN forward Ethernet frames, the PE network devices learn L2 state information for the L2 customer networks. The L2 state information may include media access control (MAC) addressing information for the CE network devices and customer equipment within the customer network and the physical ports of the PE network device through which the customer devices are reachable. The PE network devices typically store the MAC addressing information in L2 learning tables associated with each of their physical interfaces. When switching an individual Ethernet frame having a given destination MAC address, a PE network device typically broadcasts the Ethernet frame to all of its physical ports unless the PE network device has previously learned the specific physical port through which to the destination MAC address is reachable. In this case, the PE network device forwards a single copy of the Ethernet frame out the associated physical port.

In an EVPN, MAC learning between PE network devices occurs in the control plane using a routing protocol rather than in the data plane (as happens with traditional L2 bridging/switching). For example, in EVPNs, a PE network device typically uses the Border Gateway Protocol (BGP) (i.e., an L3 routing protocol) to advertise to other provider edge network devices the MAC addresses learned from the local consumer edge network devices to which the PE network device is connected. A PE device may use BGP route advertisement message to announce reachability information for the EVPN, where the BGP route advertisement specifies one or more MAC addresses learned by the PE network device instead of L3 routing information.

In some examples, a remote PE network device may be multi-homed to first and second PE network devices in an EVPN. The first and second PE network devices are further configured as a part of the same Ethernet Segment. Initially, the first and second PE network devices may advertise Auto-Discovery (AD) routes to the remote PE network device that announce the reachability of the respective PE network devices in the Ethernet Segment. Each AD route advertisement may include different types of information, such as an MPLS label. The remote PE network device may configure its forwarding next hops to use the MPLS label from the AD route advertisement when forwarding Ethernet frames to the respective PE network devices.

At a later time, the first PE network device may learn a MAC route and advertise the MAC route to the remote PE network device. The MAC route advertisement may include different types of information, such as a learned MAC address and an MPLS label. In some examples, the MPLS label of the MAC route advertisement is different than the MPLS label of the AD route advertisement initially sent by the first PE network device to the remote PE network device. Consequently, the remote PE network device may update its forwarding next hops to use the MPLS label from the MAC route advertisement when forwarding Ethernet Frames to the first PE network device in the Ethernet Segment. The process of the remote PE network device updating its forwarding next hops to the new MPLS label for the first PE network device may result in traffic loss and/or cause additional control and forwarding plane processing. Furthermore, if the first PE network device later sends a MAC route withdrawal advertisement (e.g., due to MAC aging or a link failure), the remote PE network device will update its forwarding next hops to use the MPLS label initially included in the AD route advertisement previously sent by the first PE network device. This process performed by the remote PE network device to update its forwarding next hops to the previous MPLS label may also result in traffic loss and/or cause additional control and forwarding plane processing at the remote PE network device.

SUMMARY

The techniques described herein are directed to configuring a provider edge (PE) network device of an Ethernet virtual private network (EVPN) to use a common traffic engineering label (e.g., MPLS label) for different EVPN route types associated with the same EVPN. In accordance with the techniques, the PE network device may, for example, associate a common MPLS label for an Ethernet AD route associated with a particular EVPN of an Ethernet segment and Ethernet Tag ID as well as MAC routes used to advertise MAC addresses for the EVPN. The techniques may reduce forwarding plane reconfiguration at the PE network device while performing MAC address learning for an EVPN and when responding to a network event in which at least some of the MAC addresses become unreachable due to link failure.

For example, a first PE network device of a plurality of PE network devices configured in an Ethernet segment may send an Ethernet AD route advertisement to a remote PE network device for a given EVPN. The Ethernet AD route advertisement advertises an identifier of the Ethernet segment and an EVPN-specific MPLS service label for use within the EVPN in association with the route. Responsive to receiving the Ethernet AD route advertisement, the remote PE network device may generate a forwarding next hop that defines an MPLS label stack to use when forwarding packets along the route. The MPLS label stack may specify, for example, an outer, transport MPLS label that identifies the first PE network device in the MPLS core that initially sent the Ethernet AD route advertisement. In addition, the MPLS label stack of the forwarding next hop at the remote PE network device may include an inner, service MPLS label that is the MPLS label indicated in the Ethernet AD route advertisement. As the first PE network device forwards packets associated with the EVPN, the first network PE device performs MAC learning and may sends MAC route advertisements to the remote PE network device that indicates the MAC addresses learned by the first PE router and an EVPN-specific MPLS service label.

In accordance with techniques of the disclosure, rather than sending the MAC route advertisements with an MPLS service label that is different than the MPLS label indicated in the Ethernet AD route advertisement for the EVPN, the first PE network device may include the same MPLS label from the Ethernet AD route advertisement as the EVPN-specific MPLS service label in the MAC route advertisement. Because the MAC address indicated in the MAC route for the EVPN is reachable through the first PE network device using either of the MAC route advertisement or the Ethernet AD route advertisement, the first PE network device can use the same EVPN-specific MPLS service label for both advertisements although the route types are different. The remote PE network device, upon receiving the MAC route advertisement, determines that the EVPN-specific MPLS service label indicated in the MAC route is the same as the inner label of the MPLS label stack for the forwarding next hop that corresponds to the first PE network device. Because the MPLS label in the MAC route is the same as the inner label of the label stack for the forwarding next, the remote PE network device does not need to update the inner label of the label stack for the forwarding next hop while performing MAC address learning or in response to a network event, such as link or node failure. In this way, by using the same EVPN-specific MPLS service label for different route types (e.g., Ethernet AD route advertisements and MAC route advertisements) techniques of the disclosure may reduce the amount of control and forwarding plane processing to update MPLS label stacks of forwarding next hops of an EVPN in response to link or node failure. Consequently, techniques of the disclosure may reduce traffic loss caused by changing label stack and may also optimize MPLS label usage for EVPN.

In one example, a method includes sending, by a first provider edge (PE) network device that is configured in a layer two (L2) segment of an Ethernet Virtual Private Network (EVPN) and to a second PE network device, a first layer three (L3) control plane message that indicates a label-switched network protocol label that corresponds to a first EVPN route type, wherein the first L3 control plane message indicates that the first PE network device is reachable in the L2 segment. The method may also include performing, by the first PE network device, L2 address learning to determine at least one L2 address associated with the layer two segment of the EVPN. The method may also include responsive to determining the at least one L2 address, sending, by the first PE network device and to the second PE network device, a second L3 control plane message that indicates the same label included in the first L3 control plane message corresponds to a second EVPN route type, wherein the second L3 control plane message indicates that the L2 address is reachable in the L2 segment through the first PE network device.

In one example, a network device that is a first provider edge (PE) network device, wherein the first PE network device is configured in a layer two (L2) segment of an Ethernet Virtual Private Network (EVPN), includes an Ethernet Virtual Private Network (EVPN) module that sends to a second PE network device, a first layer three (L3) control plane message that indicates a label-switched network protocol label that corresponds to a first EVPN route type, wherein the first L3 control plane message indicates that the first PE network device is reachable in the L2 segment. The EVPN module may perform L2 address learning to determine at least one L2 address associated with the layer two segment of the EVPN. The EVPN module, responsive to determining the at least one L2 address, may send to the second PE network device, a second L3 control plane message that indicates the same label included in the first L3 control plane message corresponds to a second EVPN route type, wherein the second L3 control plane message indicates that the L2 address is reachable in the L2 segment through the first PE network device.

In one example, a method includes receiving, from a first provider edge (PE) network device that is configured in a layer 2 (L2) segment of an Ethernet Virtual Private Network (EVPN) and by a second PE network device, a first layer 3 (L3) control plane message that indicates a L2 label-switched network protocol label corresponding to a first EVPN route type, wherein the first L3 control plane message indicates that the first PE network device is reachable in the L2 segment. The method may include configuring, by the second PE network device, a label stack for a forwarding next hop that indicates the first PE router, the label stack including: a service label that comprises the L2 label-switched network protocol label corresponding to the first EVPN route type, and a transport label that identifies the first PE network device in an MPLS core of the EVPN. The method may include, responsive to applying the label stack to a network packet received by the second PE network device, forwarding, by the second PE network device, the network packet to the first PE network device. The method may include receiving, by the second PE network device and from the first PE network device, a second L3 control plane message that indicates a MAC route associated with the layer two segment of the EVPN. The method may include, responsive to determining that a L2 label-switched network protocol label included in the second L3 control plane message is the same as the service label of the label stack for the forwarding next hop that indicates the first PE router, processing, by the second PE network device, the MAC route without updating the service label of the label stack.

In one example, a network device that is a second provider edge (PE) network device includes a network interface that receives, from a first PE network device that is configured in a layer 2 (L2) segment of an Ethernet Virtual Private Network (EVPN), a first layer 3 (L3) control plane message that indicates a L2 label-switched network protocol label corresponding to a first EVPN route type, wherein the first L3 control plane message indicates that the first PE network device is reachable in the L2 segment. The network device may also include an EVPN module that configures a label stack for a forwarding next hop that indicates the first PE router, the label stack including: a service label that comprises the L2 label-switched network protocol label corresponding to the first EVPN route type, and a transport label that identifies the first PE network device in an MPLS core of the EVPN. The EVPN module may, responsive to applying the label stack to a network packet received by the second PE network device, forwards the network packet to the first PE network device. The network device may receive, from the first PE network device, a second L3 control plane message that indicates a MAC route associated with the layer two segment of the EVPN. The EVPN module may, responsive to determining that a L2 label-switched network protocol label included in the second L3 control plane message is the same as the service label of the label stack for the forwarding next hop that indicates the first PE router, processes the MAC route without updating the service label of the label stack.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
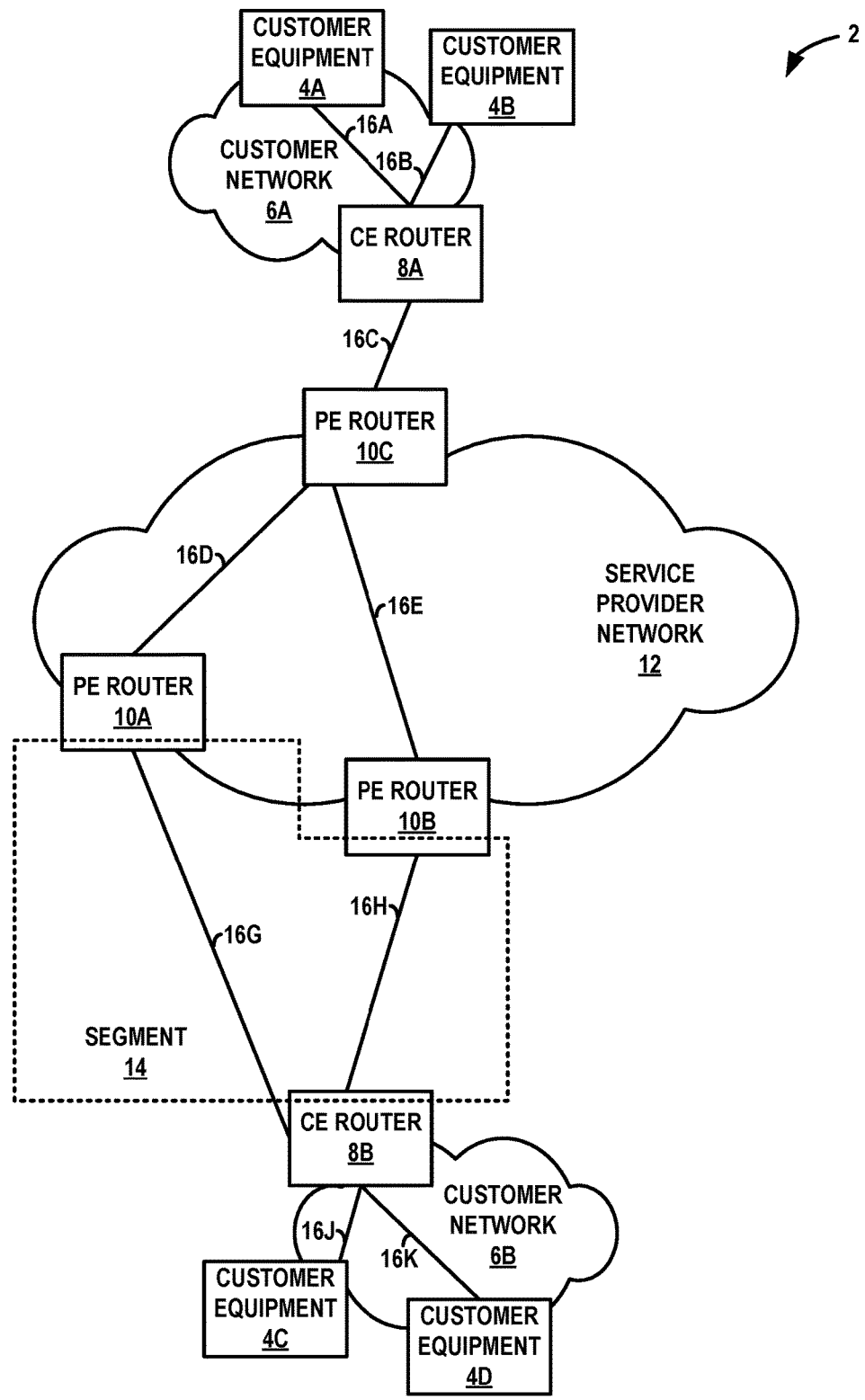
FIG. 1 is a block diagram illustrating an example system in which a first provider edge (PE) router uses a common L2 label for different EVPN route types to reduce forwarding plane reconfiguration at a second PE router, in accordance with techniques of the disclosure.

FIG. 1 is a block diagram illustrating an example system in which a first provider edge (PE) router uses a common L2 label for different EVPN route types to reduce forwarding plane reconfiguration at a second PE router, in accordance with techniques of the disclosure. In the example of FIG. 1, PE routers 10A-10C ("PE routers 10") provide customer devices 4A-4D ("customer devices 4") associated with customer networks 6A-6B ("customer networks 6") with access to service provider network 12 via CE routers 8A-8B ("CE routers 8"). Network links 16A-16H may be Ethernet, ATM or any other suitable network connections.

PE routers 10 and CE routers 8 are illustrated as routers in the example of FIG. 1; however, techniques of the disclosure may be implemented using switches or other suitable network devices. Customer networks 6 may be networks for geographically separated sites of an enterprise.

Each of customer networks 6 may include additional customer equipment 4A-4D ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 6. Nonetheless, for ease of description, only customer networks 6A-6B are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other. Service provider network 12 may include a variety of network devices other than PE routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes Ethernet Virtual Private Network (EVPN). EVPN is a service that provides a form of L2 connectivity across an intermediate network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected. In a way, EVPN enables a form of transparent LAN connection between two geographically distant customer sites that each operates a L2 network and, for this reason, EVPN may also be referred to as a "transparent LAN service."

To configure EVPN, LSPs may be configured such that each of PE routers 10 that provide EVPN for consumption by the subscribing entity is interconnected by way of LSPs to every other one of the PE devices that provide EVPN for consumption by the subscribing entity. In the example of FIG. 1, each of PE routers 10 provides access to the EVPN for carrying traffic associated with customer networks 6 and, therefore, each of PE devices 10 within the same Ethernet segment may be connected to every other PE device 10 via LSPs. Once LSPs are configured in this manner, EVPN may be enabled within PE devices 10 to operate over the LSPs, which may in this context operate as logical dedicated links through service provider network 12. In operation, EVPN generally involves prepending or otherwise inserting a tag and a LSP label onto incoming L2 packets, which may also be referred to as L2 frames (particularly in the context of Ethernet), and transmitting the tagged packets through a corresponding one of the configured LSPs. Once EVPN is configured within service provider network 12, customer devices 4 within customer networks 6 may communicate with one another via EVPN as if they were directly connected L2 networks.

In the example of FIG. 1, when providing the EVPN service to customer networks 6, PE routers 10 and CE routers 8 typically perform MAC address learning to efficiently forward L2 network communications in system 2. That is, as PE routers 10 and CE routers 8 forward Ethernet frames, the routers learn L2 state information for the L2 network, including media access control (MAC) addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the destination L2 address (e.g, MAC address) specified in the Ethernet frame. In this case, the router forwards a single copy of the Ethernet frame out the associated interface.

Moreover, as PE routers 10 learn the MAC address for customer equipment 4 reachable through local attachment circuits, the PE routers 10 utilize route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 of system 2, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of a customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN.

In this way, PE routers 10 may perform both local learning and remote learning of MAC addresses. Each of PE routers 10 (e.g., PE router 10C) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determines whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed when it is coupled to two or more physically different PE routers on the same EVI when the PE routers are resident on the same physical Ethernet Segment. As one example, CE router 8B is coupled to PE routers 10A, 10B via links 16G, 16H, respectively, where PE routers 10A, 10B are capable of providing access to EVPN for L2 customer network 6B via CE router 8B. In instances where a given customer network (such as customer network 6B) may couple to service provider network 12 via two different and, to a certain extent, redundant links, the customer network may be referred to as being "multi-homed." In this example, CE router 8B may be multi-homed to PE routers 10A, 10B because CE router 8B is coupled to three different PE routers 10A, 10B via separate and, to a certain extent, redundant links 16G, 16H, where both of PE routers 10A, 10B are capable of providing access to EVPN for L2 customer network 6B. Multi-homed networks are often employed by network operators so as to improve access to EVPN provided by service provider network 12 should a failure in one of links 16G, 16H occur.

As shown in FIG. 1, A CE and/or PE network device, such as CE router 8B or PE router 10C may be multi-homed to two or more PE network devices that collectively comprise an "Ethernet segment." For instance, in the example of FIG. 1, PE routers 10A-10B are included in Ethernet segment 14. Moreover, physical links 16G, 16H of Ethernet segment 14 may appear to routing and forwarding functions within CE router 8B as a Link Aggregation Group (LAG), i.e., a single logical link. Ethernet segments have an identifier, called the "Ethernet Segment Identifier" (ESI), which may be encoded as a ten octets integer. In general, an Ethernet segment uses a non-reserved ESI that is unique network wide (e.g., across all EVPNs on all the PEs). In some examples, a network operator may manage ESIs throughout the EVPN to ensure unique network wide ESIs for respective Ethernet segments. In other examples, ESIs may be allocated automatically. In this example of FIG. 1, Ethernet segment 14 includes PE routers 10A-10B and CE router 8B, and Ethernet segment 14 may be associated with a unique ESI.

Using ESIs, PE routers 10 may share learned MAC addresses by sending MAC Advertisement routes that specify, among other information, a learned MAC address and a corresponding ESI. In this way, PE routers may maintain tables of MAC addresses associated with corresponding ESIs. Consequently, a PE router that receives and maintains MAC addresses that were previously learned by other PE routers can determine that a MAC route is accessible through multiple PE routers that are associated with the same ESI.

As described above, PE routers 10 may use control plane signaling with different route types to provision the EVPN service in service provider network 12. EVPN defines BGP Network Layer Reachability Information (NLRI), and in particular, defines different route types. The EVPN NLRI is carried in BGP using BGP Multiprotocol Extensions. Route types include but are not limited to: Ethernet Auto-Discovery (AD) routes, MAC advertisement routes, and Ethernet Segment Routes. AD routes, for example, specify a Route Distinguisher (RD) (e.g., an IP address of an MPLS Edge Switch (MES)), ESI, Ethernet Tag Identifier, and MPLS label. MAC advertisement routes include a RD, ESI, Ethernet Tag Identifier, MAC address and MAC address length, IP address and IP address length, and MPLS label. An Ethernet Segment route includes a Route Distinguisher and Ethernet Segment Identifier.

PE routers 10 and CE routers 8 may share NLRI to configure one or more Ethernet segments and share MAC routes that are learned by the respective devices. In general, PE routers connected to the same Ethernet segment can automatically discover each other with minimal to no configuration through the exchange of the Ethernet Segment route using BGP. In multi-homed environments EVPN defines a mechanism to signal, to remote PE routers, the need to update their forwarding tables upon the occurrence of a failure in connectivity to an Ethernet segment. This is done by having each PE router advertise an Ethernet AD Route per Ethernet segment for each locally attached segment which indicates the reachability of the PE router in the Ethernet segment. Upon a failure in connectivity to the attached segment, the PE router withdraws the corresponding Ethernet AD route by sending an AD route withdrawal message to other PE routers. This triggers all PE routers that receive the withdrawal to update their next-hop adjacencies for all MAC addresses associated with the Ethernet segment specified by the Ethernet AD route. If no other PE routers had advertised an Ethernet AD route for the same segment, then the PE router that received the withdrawal simply invalidates the MAC entries for that segment.

In some examples, PE routers 10A-10B may operate in "active-active mode" or "single-active mode" when forwarding network packets between PE router 10C and CE router 8B. In active-active mode (or "all-active" mode), PE router 10C is multi-homed to two or more PE routers, such as PE routers 10A-10B. In one example of active-active mode, all of PE routers 10A-10B in such a redundancy group can forward traffic to/from multi-homed PE router 10C for a given EVPN. By contrast, in single-active mode (or "active/standby" mode), when PE router 10C is multi-homed to two or more PE routers, such as PE routers 10A-10B, only a single PE router in such a redundancy group forwards traffic to/from multi-homed PE router 10C for a given EVPN.

In active-active mode, an EVPN also provides configuration for "aliasing." Aliasing refers to the ability of a PE router to signal that it has reachability to a given locally attached Ethernet segment, even when it has learned no MAC addresses from that segment. An Ethernet AD route, which includes an ESI for an Ethernet segment, may be used to signal this configuration of a PE router. Remote PE routers which receive MAC advertisement routes with non-reserved ESI may consider an advertised MAC address as reachable via all PE routers which have advertised reachability to the relevant Ethernet segment. A remote PE router may generally refer to a PE router not included in an Ethernet segment and/or EVI. As one example of aliasing in active-active mode, PE router 10A may advertise an Ethernet AD route to PE router 10C. Using aliasing, PE router 10C would, in response to receiving the Ethernet AD route, forward traffic to PE router 10B as well as PE router 10A because PE routers 10A-10B are in Ethernet segment 14. In active-active mode, "aliasing" provides for load-balancing among different PE routers, while in single-active mode "aliasing" provides for fast convergence to a backup PE router in the event that a PE router configured as the "designated forwarder" fails.

An EVPN also provides for configuration of a designated forwarder in multi-homed environments. In the case of an EVI configured in single-active mode of a multi-homed environment, one of PE routers 10A-10B is configured (or "elected") as a designated forwarder in the EVI and the remaining PE router of PE routers 10A-10B is configured as non-designated forwarder devices (or "backup devices"). In such examples, the designated forwarder learns MAC routes and shares such MAC routes with, for example, PE router 10C. Generally, a designated forwarder may be responsible for sending multicast and broadcast traffic, on a given Ethernet Tag on a particular Ethernet segment, to a CE router. For instance, PE router 10A may be configured as the designated forwarder to send traffic from PE router 10C to CE router 8B in Ethernet Segment 14. PE router 10B may be configured as backup devices that do not send network traffic from PE router 10C to CE router 8B because PE router 10A is configured as the designated forwarder. PE router 10A may be configured as the designated forwarder to send traffic from CE router 8B to PE router 10C in Ethernet segment 14. PE router 10B is configured as a backup device that does not send network traffic from PE router 10C to CE router 8B because PE router 10A is configured as the designated forwarded.

A designated forwarder may also be responsible for flooding unknown unicast traffic (i.e. traffic for which an PE does not know the destination MAC address), on a given Ethernet Tag on a particular Ethernet segment to the CE router, if the environment requires flooding of unknown unicast traffic. In such configurations, a CE router sends packets belonging to a specific flow using a single link towards a PE router. For instance, if the CE router is a host, the host treats the multiple links that it uses to reach the PE routers as a Link Aggregation Group (LAG). The CE router may employ a local hashing function to map traffic flows onto links in the LAG.

An EVPN may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path.

As shown in the example of FIG. 1, PE routers 10A-10C may provide an MPLS core for sending network packets from customer network 6A to and from customer network 6B. Each of PE routers 10A-10C implement the MPLS protocol and apply one or more MPLS labels, i.e., a label stack, to network packets in accordance with routing and forwarding information configured at each respective PE router. In an EVPN, a label stack applied to a network packet may include multiple labels. For instance, a label stack may include an outer label and an inner label.

The outer label serves as a "transport label" that uniquely identifies a PE router in an MPLS core. That is, each of PE routers 10A-10C may exchange control plane messages at configuration and startup that specify an outer label that uniquely identifies each respective PE router. For instance, PE router 10A may send control plane messages that specify an outer label that identifies PE router 10A to PE routers 10B-10C. PE routers 10B-10C may configure their respective forwarding next hops such that network packets that include the outer label corresponding to PE router 10A are forwarded to PE router 10A.

The inner label, or "service label," of the MPLS label stack provides EVPN-specific configuration information. In particular, as described above, EVPN defines Ethernet AD routes, MAC advertisement routes, and Ethernet Segment routes. An Ethernet AD route, for example, may be structured according to the following format of Table 1:

TABLE 1

AD route advertisement

Route Descriptor (8 octets)
Ethernet Segment Identifier (10 octets)
Ethernet Tag ID (4 octets)
MPLS Label (3 octets)

In one example, PE router 10A may send an Ethernet AD route to PE router 10C initially at startup and configuration that includes an MPLS label as shown above. PE router 10C may configure its forwarding next hops to apply the MPLS label of the Ethernet AD route from PE router 10A as the inner label in a label stack applied to network packets that are destined to PE router 10A. PE router 10C would then apply the transport label identifying PE router 10A as the outer label in the label stack. In this way, the inner label provides EVPN-specification configuration information about the Ethernet AD route that PE router 10C uses to forward network packets through the EVPN.

At a later time, PE router 10A, through MAC learning, may learn a MAC address for customer equipment 4C. PE router 10A may send a MAC advertisement route to PE router 10C that indicates the MAC address for customer equipment 4C. A MAC advertisement route, for example, may be structured according to the following format:

TABLE 2

MAC Advertisement Route

Route Descriptor (8 octets)
Ethernet Segment Identifier (10 octets)
Ethernet Tag ID (4 octets)
MAC Address Length (1 octet)
MAC Address (6 octets)
IP Address Length (1 octet)
IP Address (4 or 16 octets)
MPLS Label (3 octets)

PE router 10A may send the MAC advertisement route that includes an MPLS label as shown above to PE router 10C upon learning the MAC address of customer equipment 4C. In the current EVPN specification ("BGP MPLS Based Ethernet VP", draft-ietf-l2vpn-evpn-04, Jul. 14, 2013), the MPLS label for the MAC advertisement route may be different than the MPLS label for the Ethernet AD route advertisement, although customer equipment 4C is reachable through Ethernet Segment 14 via PE router 10A using either of the MPLS label from the Ethernet AD router advertisement or the MPLS label of the MAC route advertisement.

Under the current EVPN specification ("BGP MPLS Based Ethernet VP", draft-ietf-l2vpn-evpn-04, Jul. 14, 2013), PE router 10C would update its forwarding next hops to apply the MPLS label of the MAC route advertisement from PE router 10A as the inner label in a label stack applied to network packets that are destined to PE router 10A. That is, PE router 10C, upon receiving the MAC route advertisement would update its forwarding next hops to the MPLS label of the MAC route advertisement because the MPLS label different from the MPLS label of the Ethernet AD route advertisement, thereby causing additional control and forwarding plane processing during which some packets might also be dropped. Furthermore, if PE router 10A later withdraws the MAC route due to its MAC aging time, PE router 10B, in order to continue load balancing the traffic destined for this MAC address, may update the MPLS label stack for PE router 10A with the MPLS label obtained from PE router 10A's Ethernet AD route, since the MPLS label obtained from its MAC route is no longer usable. This may also potentially cause traffic lose and add extra processing and configuration on PE router 10C.

Techniques of this disclosure may improve MPLS label usage for MAC advertisement routes and Ethernet AD routes in single-active and all-active multi-homing cases, thereby reducing traffic loss and additional control and forwarding plane processing. In particular, rather than using different MPLS labels for MAC advertisement routes and Ethernet AD routes, a PE router may use the same MPLS label for the inner label of the MPLS label stack. In some examples, the same MPLS label is used for a given multi-homed Ethernet segment and Ethernet Tag ID combination. Consequently, a remote PE router that initially receives the MPLS label from a PE router (e.g., in an Ethernet AD route at initial configuration and startup) may not need to update its control and forwarding plane information again upon later receiving a MAC route advertisement because the MPLS label of the MAC route advertisement is the same as the MPLS label of the initial Ethernet AD route. Thus, because the inner label for the MPLS stack is the same for both route types, techniques of the disclosure may reduce the number of updates to forwarding next hops in the forwarding information of the remote PE router. In this way, techniques of the disclosure may reduce the amount of control and forwarding plane processing. Furthermore, techniques of the disclosure may reduce the amount of traffic loss that might otherwise occur due to control and/or forwarding plane processing.

In operation, as shown in FIG. 1, PE routers 10A-10B, at initial configuration and startup, send Ethernet AD route advertisements to PE router 10C. That is, PE router 10A, configured in an EVPN that includes Ethernet segment 14, sends a layer 3 control plane message, such as an Ethernet AD route advertisement. The Ethernet AD route advertisement indicates a layer 2 label-switched network protocol label, such as an MPLS label that is used by PE router 10C as the inner label of the MPLS label stack on subsequent network packets forwarded by PE router 10C to PE router 10A. The MPLS label sent in the Ethernet AD route may correspond to a first EVPN route type, which in the current example, is an Ethernet AD route. In some examples, PE router 10A may store the MPLS label sent in the Ethernet AD route advertisement for later use in accordance with techniques of the disclosure.

The Ethernet AD route advertisements sent to PE router 10C indicate the reachability of PE routers 10A-10B in Ethernet segment 14. PE router 10 receives the respective Ethernet AD routes and configures its forwarding plane accordingly. In particular, if PE router 10C is operating in active-active mode, PE router 10C creates an Equal-Cost Multi-Path (ECMP) forwarding next hop that specifies, e.g., egress interfaces that are operatively coupled by network links to PE routers 10A, 10B, respectively. That is, the ECMP forwarding next hop may specify a first MPLS label stack for PE router 10A and a second, different MPLS label stack for PE router 10B. In an alternative example, if PE router 10C is configured in single-active (or active-standby) mode, PE router 10C forwarding next hop for PE router 10A (for example, the designated forwarder) and backup forwarding next hop for PE router 10B (the backup designated forwarder). In any case, PE router 10C configures its forwarding plane to forward network packets in accordance with the Ethernet AD route advertisements.

After initial configuration and startup, PE router 10A may perform MAC learning as described above to determine at least one MAC route associated with Ethernet segment 14 of the EVPN. For instance, PE router 10A may learn MAC routes for one or more of customer equipment 4C and 4D in customer network 6B. Upon learning a MAC route, PE router 10A may send a MAC route advertisement to PE router 10C. That is, responsive to determining the at least one MAC route, PE router 10A may send, to PE router 10C, a second layer 3 control plane message. The layer 3 control plane message may be a MAC route advertisement that comprises information about the MAC route learned by PE router 10A. The MAC route advertisement may indicate that the MAC route is reachable in the Ethernet segment 14 through the first PE network device. In accordance with techniques of the disclosure, PE router 10A includes the same MPLS inner label in the MAC route advertisement that PE router 10A included in the Ethernet AD route. In other words, PE router 10A does not send to PE router 10C an MPLS label in the MAC route that is different from the MPLS label included in the Ethernet AD route. Thus, the MPLS label included in the MAC route advertisement also corresponds to a second EVPN route type, i.e., a MAC route type. In this way, the MPLS label included in the Ethernet AD route advertisement and the MAC route advertisement are the same.

PE router 10C receives the MAC route advertisement from PE router 10A. Responsive to receiving the MAC route advertisement from PE router 10A, PE router 10C determines that the MPLS label for the MAC route advertisement is the same as the MPLS label for the Ethernet AD route previously received from PE router 10A. In other words, the MPLS label configured in the forwarding next hop of PE router 10C for PE router 10A that is based on the Ethernet AD route is already the same as the MPLS label specified in the MAC route advertisement that was subsequently sent by PE router 10A. Consequently, in accordance with techniques of the disclosure, PE router 10C does not need to update its forwarding next hop for the MAC route specified in the MAC route advertisement because the MPLS label specified is the MAC route advertisement is the same as the MPLS already configured in the forwarding plane of PE router 10C for the specified route. In other words, responsive to determining that the MPLS label included in the MAC route advertisement is the same as the service label of the label stack for the forwarding next hop that indicates the PE router 10A (that was initially configured based on the Ethernet AD route advertisement), PE router 10 can process the MAC route advertisement, as described above, without updating the service label of the label stack.

Because both the Ethernet AD route and the MAC route are reachable through Ethernet segment 14 using PE router 10A and the MPLS label for both the Ethernet AD route and the MAC route are the same, PE router 10C does not need to reconfigure its routing and forwarding information. Consequently, PE router 10C can continue applying the same label stack to network traffic destined for PE router 10A. Therefore, techniques of the disclosure may reduce the amount of processing performed by PE router 10C to configure its routing and forwarding information because PE router 10A uses the same MPLS label for the Ethernet AD route advertisement and the MAC route advertisement. Moreover, because PE router 10C may perform less configuration of its routing and forwarding information, PE router 10C may drop less network traffic.

If PE router 10B later receives a network packet from CE router 8B with a MAC address that was previously learned by PE router 10A but not by PE router 10B, then PE router 10B may send a MAC route advertisement to PE router 10C. Because the inner MPLS label of the MAC router advertisement is the same as the Ethernet AD route advertisement previously sent by PE router 10B to PE router 10C, PE router 10C does not need to update MPLS label stack corresponding to PE router 10B of the compound forwarding next hop (e.g., ECMP next hop).

Figure 2:
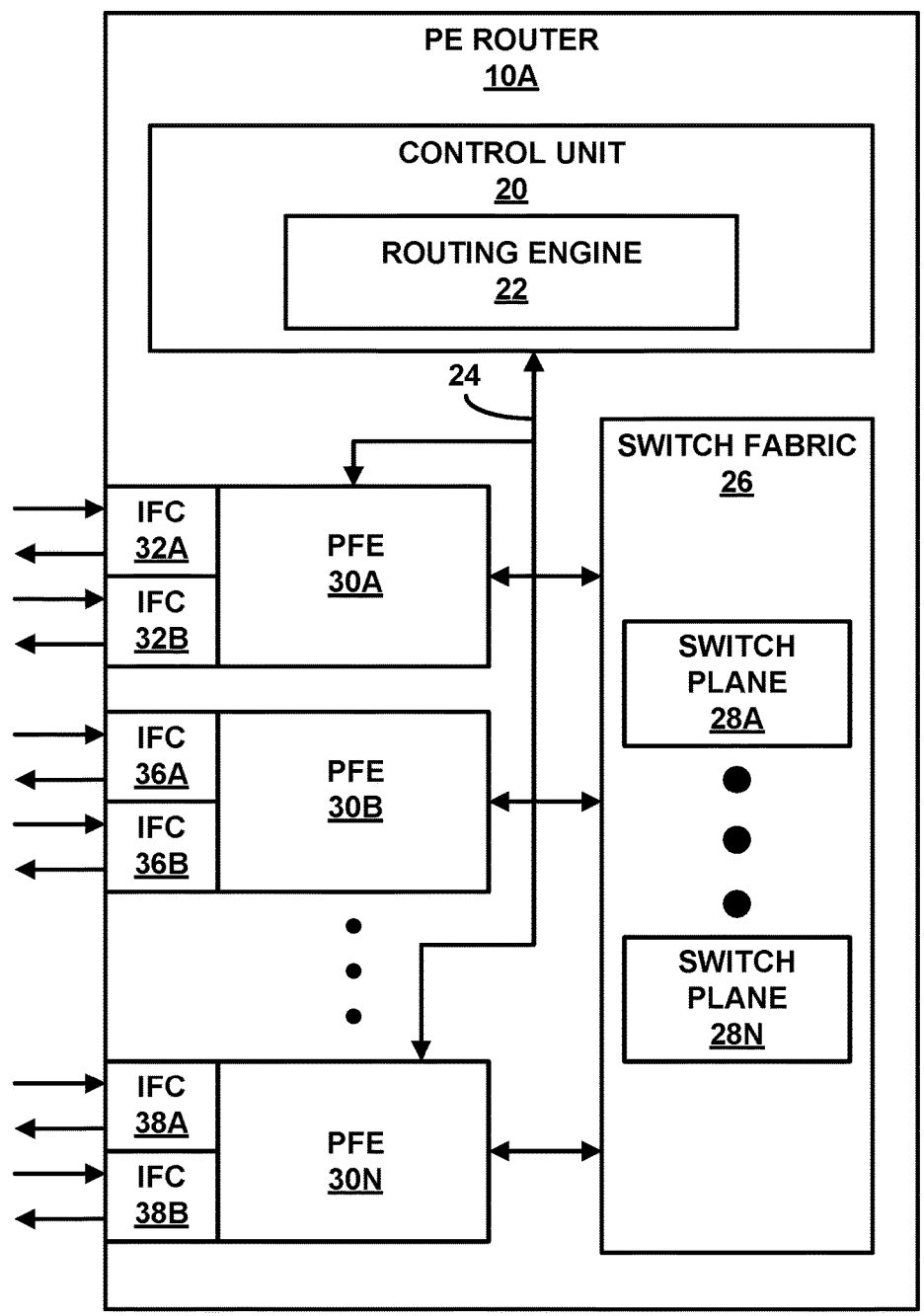
FIG. 2 is a block diagram illustrating the example PE router of FIG. 1 in greater detail, in accordance with techniques of the disclosure.

FIG. 2 is a block diagram illustrating example PE router 10A of FIG. 1 in greater detail, in accordance with techniques of the disclosure. PE router 10A includes control unit 20, switch fabric 26, and PFEs 30A-30N ("PFEs 30"), capable of implementing techniques of the disclosure. PFEs 30 may receive and send data via interface cards 32A-32B, 36A-36B, and 38A-38B ("IFCs 32", "IFCs 36", and "IFCs 38", respectively). In other embodiments, each of PFEs 30 may comprise more or fewer IFCs. Switch fabric 26 provides an interconnect mechanism for forwarding data between PFEs 30 for transmission over a network, e.g., the Internet.

Routing engine 22 maintains routing tables, executes routing protocol and controls user access to PE router 10A. In this example, routing engine 22 is connected to each of PFEs 30 by a dedicated link 24, which may be an internal Ethernet link. For example, dedicated link 24 may comprise a 100 Mbps Ethernet connection. Routing engine 22 maintains routing information that describes a topology of a network, and derives a forwarding information base (FIB) in accordance with the routing information. Routing engine 22 copies the FIB to each of PFEs 30. This allows the FIB in each of PFEs 30 to be updated without degrading packet forwarding performance of PE router 10A. Alternatively, routing engine 22 may derive separate FIBs which are copied to respective PFEs 30.

Control unit 20 provides an environment for storing L2 network topology information, e.g., spanning tree information, executing CFM protocols to provide fault isolation and detection over large L2 networks, and providing a management interface to allow user access and configuration of PE router 10A. The operating environment of control unit 20 may be implemented solely in software, or hardware, or may be implemented as a combination of software, hardware or firmware. For example, control unit 20 may include one or more processors which execute software instructions. In that case, control unit 20 may include various software modules or daemons, and may include a computer-readable storage medium, such as computer memory or hard disk, for storing executable instructions.

In a routing node, a "switch plane" is generally capable of providing a communication path between any two of PFEs 30. In this example, switch fabric 26 consists of multiple standalone switch planes 28A through 28N ("switch planes 28"). In some embodiments, each of switch planes 28 is provided by one or more switch fabric chips on one or more separate, removable switch cards. Other routing nodes that implement the techniques described herein may comprise additional or fewer switch planes, including a single switch plane. A majority of the switch planes may be active at any given time with data packets distributed over the active switch planes. The inactive switch plane(s) of switch fabric 26 serves as back-up switch plane(s) such that if one or more of the active switch planes goes offline, the back-up switch plane(s) automatically activate, and the bandwidth capacity of PE router 10A is not diminished. The back-up switch plane(s) may be identical to the active switch planes and act as hot spare(s) to maintain bandwidth capacity in the event that one or more of the active switch planes fail. Each of switch planes 28 is operationally independent; therefore, PE router 10A may continue to forward packets as long as at least one of switch planes 28 remain active, but possibly at a reduced bandwidth capacity.

As part of a standalone router, switch planes 28 form a standalone switch fabric 26. That is, each of switch planes 28 is capable of providing a connection between any of PFEs 30 within PE router 10A. In this manner, switch planes 28 form a standalone switch fabric that enables packet forwarding between the plurality of PFEs 30 of PE router 10A. For example, switch fabric 26 may be provided by a set of removable switch cards, where each removable switch card provides a respective one of switch planes 28.

As shown in FIG. 2, PFE 30A and PFE 30B may be ingress PFEs that receive network packets at one or more of interfaces 32A-32B and 36A-36B, respectively. Ingress PFEs 30A and 30B may route the network packets to PFE 30N, which may be an egress PFE. Consequently, egress PFE 30 may route network packets to other network devices via one or more of network interfaces 38A-38B. In FIG. 2, PE router 10A and PE router 10B may be operating in single-active (or active-standby mode) in which PE router 10A is the designated forwarder and PE route 10B is the backup router.

In accordance with techniques of the disclosure, routing engine 22 initially advertises the reachability of an Ethernet segment by sending an Ethernet AD route advertisement to PE router 10C. A route may be reachable from PE router 10A to a MAC address of customer equipment in customer network 6B. For instance, routing engine 22 may implement a layer 3 protocol such as BGP. Upon initial configuration and startup, routing engine 22 may use BGP to send an Ethernet AD route advertisement to PE router 10C that includes an Ethernet segment identifier of Ethernet segment 14 and an MPLS label. PE router 10B may also send an Ethernet AD route that indicates such information.

PE router 10C may receive the Ethernet AD route advertisements from PE routers 10A and 10B. In some examples, PE router 10C configures its forwarding information, such that the MPLS label stack used in the next hop is built based on the MPLS label indicated in the Ethernet AD route advertisement received from PE router 10A. As described herein, the remote PE router, e.g., PE router 10C may use an MPLS label obtained from an Ethernet AD route advertisement to reach a multi-homed PE router (e.g., PE router 10B) that has not learned one or more MAC routes of the Ethernet segment, i.e., to send a known unicast packet to the multi-homed PE router that has not advertised the MAC route. In particular, the remote PE router may use an MPLS label stack configured for a next-hop to reach the multi-homed PE.

As one example, PE router 10C may determine that PE router 10A is the designated forwarder based on information indicated in the Ethernet AD route from PE router 10A. PE router 10C further determines PE router 10B as the backup path. PE router 10C may configure PE router 10B as the backup PE router for reaching MAC routes that PE router 10C identified based on MAC route advertisements from PE router 10A. PE router 10C builds a forwarding next hop for PE router 10A that includes a label stack of the MPLS LSP label (outer) and MPLS label (inner) to reach PE router 10A, wherein the value of the inner MPLS label is equal to the MPLS label included in the Ethernet AD route received by PE router 10C from PE router 10A.

At a later time, PE router 10A may receive a network packet from customer equipment 4C via CE router 8B and perform MAC learning to learn a MAC route corresponding to customer equipment 4C. To share the MAC route with PE router 10C, PE router 10A may generate a MAC route advertisement that indicates the MAC address of customer equipment 4C. To do so, PE router 10A identifies a MAC address corresponding to customer equipment included in a CE network 6B based on the network packet. The MAC route advertisement may further include an Ethernet segment identifier that identifies Ethernet segment 14 and an MPLS label. In accordance with techniques of the disclosure, PE router 10A includes, as the MPLS label in the MAC route advertisement, the same MPLS label value that was previously included in the Ethernet AD route advertisement that PE router 10A sent to PE router 10C. That is, to avoid traffic loss at PE router 10C that may be caused when PE router 10C replaces the MPLS label stack constructed based on the Ethernet AD route to a different MPLS constructed based on the MAC advertisement route or vice versa, PE router 10A selects the same MPLS label for both the MAC route advertisement and its corresponding Ethernet AD route. PE router 10C therefore applies the same label stack to network traffic destined for PE router 10A in Ethernet segment 14 after receiving the MAC route advertisements. In some examples, PE router 10A uses the same MPLS label for a given multi-homed Ethernet Segment and Ethernet Tag ID combination. Consequently, techniques of the disclosure may avoid traffic loss at PE router 10C that would otherwise potentially be caused by PE router 10A changing label stack in its forwarding next hops because the MPLS labels for the MAC route advertisement and the Ethernet AD route advertisement were different. In this way, techniques of the disclosure may optimize the MPLS label usage for EVPN multi-homing. Thus, techniques of the disclosure may reduce CPU/memory utilization at one or more of PE routers 10A-10C.

In some examples, PE router 10A may experience a link failure at network link 16G. Responsive to determining that a link failure has occurred, routing engine 22 may send an Ethernet AD route withdrawal advertisement to PE router 10C. The Ethernet AD route withdrawal advertisement may include, among other information, the Ethernet segment identifier for Ethernet segment 14.

PE router 10C upon receiving the Ethernet AD route withdrawal advertisement from PE router 10A, updates the forwarding next hops for MAC routes in Ethernet segment 14 that are currently associated with PE router 10A to PE router 10B. For instance, the forwarding next hop of the MAC route for customer equipment 4C is updated to correspond to PE router 10B. That is, PE router 10C may update the forwarding next hop to use a label stack for PE router 10B wherein the MPLS LSP label (outer) identifies PE router 10B in the MPLS core of service provider network 12 and the MPLS label (inner) is equal to the MPLS label included in the Ethernet AD route received by PE router 10C from PE router 10B initially. However, PE router 10C does not need to update its forwarding next hops for MAC routes previously associated with PE router 10A because the label stack for PE router 10A is the same for the Ethernet AD route advertisement as for the MAC route advertisements. That is, the inner MPLS label is the same for both the Ethernet AD route advertisement and the MAC route advertisements previously sent by PE router 10A. In other words, responsive to receiving the Ethernet AD route withdrawal advertisement, PE router 10C can update its forwarding information to apply the label stack for PE route 10B to network traffic that is forwarded by PE router 10C to PE router 10B, without updating the service label of the label stack that corresponds to PE route 10A. In some examples, the aforementioned techniques may be applied in a single-active multi-homed EVPN environment.

Because PE router 10A has experienced a link failure, PE router 10B becomes the new designated forwarder in Ethernet segment 14. Therefore, PE router 10B may begin performing MAC learning to learn MAC routes for customer equipment in customer network 6B. For instance, PE router 10B may receive a network packet from customer equipment 4C via CE router 8B. Since PE router 10B is learning the MAC route for customer equipment 4C for the first time, PE router 10B generates a MAC route advertisement that includes, among other information, the MAC address of customer equipment 4C and the Ethernet segment identifier for Ethernet segment 14.

In accordance with techniques of the disclosure, PE router 10B also includes, as an MPLS label in the MAC route advertisement, the same MPLS label that PE router 10B previously sent to PE router 10C in the Ethernet AD route advertisement from PE router 10B. The forwarding next hop that corresponds to the MAC route of customer equipment 4C in the forwarding plane of PE router 10C is already associated with a label stack that includes an inner MPLS label that is the same as the MPLS label previously sent by PE router 10B in its Ethernet AD route advertisement to PE router 10C. Thus, PE router 10C does not have to update its forwarding next hop for the MAC route of customer equipment 4C in response to receiving the MAC route advertisement from PE router 10B because, in accordance with techniques of the disclosure, PE router 10B used the same MPLS label for both the Ethernet AD route advertisement, and subsequently, for the MAC route advertisement corresponding to customer equipment 4C. In other words, responsive to determining that the MPLS label included in the MAC route advertisement is the same as the service label of the label stack for the next hop corresponding to PE router 10B, PE router 10C may process the MAC route advertisement without updating the service label of the label stack corresponding to PE router 10B. In this way, techniques of the disclosure, may reduce the amount of control and/or forwarding plane processing required at PE router 10C because the MPLS label is the same for both the Ethernet AD route advertisement and the MAC route advertisement sent by PE router 10B. Although described in the context of a link failure at network link 16G, PE routers 10A-10B could perform such techniques when a MAC route at a PE router of Ethernet segment 14 ages to expiration, in which case the MAC route may be by the PE router re-learned by the other PE route in Ethernet segment 14.

In an alternative example, PE routers 10A-10B may be configured in an active-active configuration. To use PE routers 10A-10B for load balancing in an all-active multi-homing case, the PE router 10C builds a MPLS nexthop with one path pointing to PE router 10A and the other pointing to PE router 10B. To reach PE router 10B, PE router 10C initially uses the same label stack as described above in the single-active multi-homing case that is based on the Ethernet AD route received from PE router 10B. In the multi-homing case, if later on PE router 10B learns the MAC route corresponding to customer equipment 4C, PE router 10B uses the same MPLS label to advertises the MAC advertisement route as PE router 10B used in its Ethernet AD route. Upon receiving the MAC route advertisement, PE router 10C does not need to take any action to update the MPLS next-hop and forwarding entry used for load balancing the unicast traffic destined for customer equipment 4C because the MPLS label for the MAC route advertisement is the same as for the initial Ethernet AD route advertisement. In other words, in some examples, when the same label is used for both MAC route advertisement and Ethernet AD route for a given ESI and VLAN in the EVPN multi-homing case, PE router 10C does not need to concern itself with which MPLS label to use when building label stack for the next-hop to reach customer equipment 4C. This may also reduce and/or minimize the number of MPLS labels used for an EVPN. Furthermore, the techniques of the disclosure may reduce the potential traffic loss for the known unicast frames ingressing PE router 10C and destined for the known MAC address of customer equipment 4C learned from multi-homed Ethernet segment 14. Thus, techniques of the disclosure may improve performance of PE router 10C.

Figure 3:
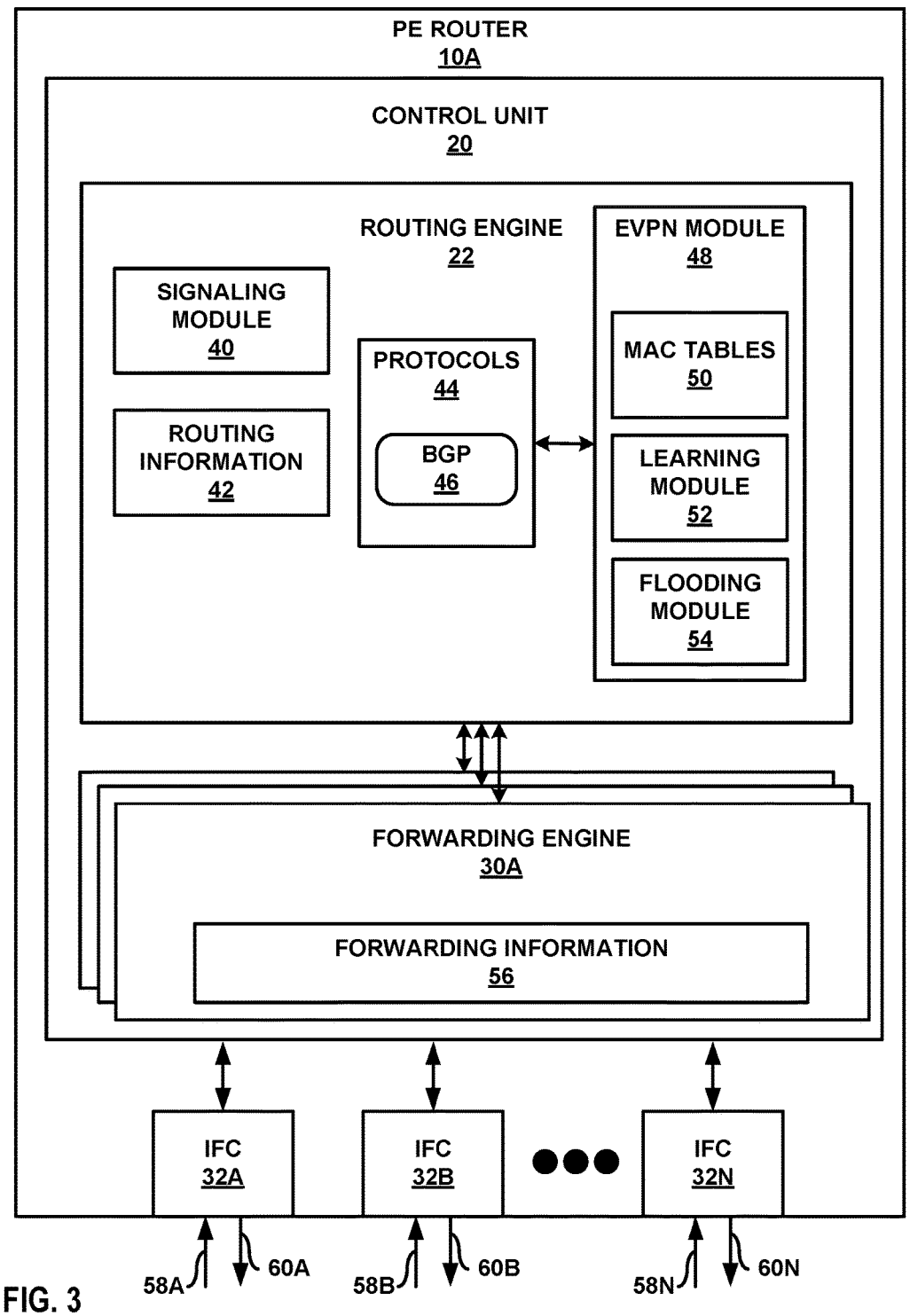
FIG. 3 is a block diagram illustrating further details of a provider edge (PE) router that uses a common L2 label for different EVPN route types to reduce forwarding plane reconfiguration at a second PE router, in accordance with techniques of the disclosure.

FIG. 3 is a block diagram illustrating further details of a provider edge (PE) router that uses a common L2 label for different EVPN route types to reduce forwarding plane reconfiguration at a second PE router, in accordance with techniques of the disclosure. PE router 10A includes a control unit 20 that includes a routing engine 22 coupled to a forwarding engine 30A-30N. PE router 10A includes interface cards 32A-38N ("IFCs 38") that receive packets via inbound links 58A-58N ("inbound links 58") and send packets via outbound links 60A-60N ("outbound links 60"). IFCs 32 are typically coupled to links 58, 60 via a number of interface ports (not shown). Inbound links 58 and outbound links 60 may represent physical interfaces, logical interfaces, or some combination thereof.

Routing engine 22 provides an operating environment for various protocols 44 that execute at different layers of a network stack. The protocols may be software processes executing on one or more processors. For example, routing engine 22 includes network protocols that operate at a network layer of the network stack. In the example of FIG. 3, network protocols include the Border Gateway Protocol (BGP) 46, which is a routing protocol. Routing engine 22 may include other protocols not shown in FIG. 3. Routing engine 22 is responsible for the maintenance of routing information 42 to reflect the current topology of a network and other network entities to which PE router 10A is connected. In particular, routing protocols periodically update routing information 42 to accurately reflect the topology of the network and other entities based on routing protocol messages received by PE router 10A.

Forwarding engines 30A-30N ("forwarding engines 30") represent hardware and logic functions that provide high-speed forwarding of network traffic. Forwarding engines 30 typically includes a set of one or more forwarding chips programmed with forwarding information that maps network destinations with specific next hops and the corresponding output interface ports. In general, when PE router 10A receives a packet via one of inbound links 58, one of forwarding engines 30 identifies an associated next hop for the data packet by traversing the programmed forwarding information based on information within the packet. One of forwarding engines 30 (either the ingress forwarding engine or a different egress forwarding engine) forwards the packet on one of outbound links 60 mapped to the corresponding next hop.

In the example of FIG. 3, forwarding engine 30A includes forwarding information 56. In accordance with routing information 42, forwarding engine 30A maintains forwarding information 56 that associates network destinations with specific next hops and corresponding interface ports. For example, routing engine 22 analyzes routing information 42 and generates forwarding information 56 in accordance with routing information 42. Forwarding information 56 may be maintained in the form of one or more tables, link lists, radix trees, databases, flat files, or any other data structures.

Forwarding engine 30A maintains forwarding information 56 for each Ethernet Virtual Instance (EVI) established by PE router 10A to associate network destinations with specific next hops and the corresponding interface ports. As described an FIG. 1, an EVI may define one or more Ethernet Segments in an EVPN. In general, when PE router 10A receives a data packet on an LSP of a given Ethernet segment via one of inbound links 58, forwarding engine 30A, for example, identifies an associated next hop for the data packet by traversing forwarding information 56 based on information (e.g., labeling information) within the packet. Forwarding engine 30A forwards the data packet on one of outbound links 60 to the corresponding next hop in accordance with forwarding information 56 associated with the Ethernet segment. At this time, forwarding engine 30A may push and/or pop labels from the packet to forward the packet along a correct LSP.

Control unit 42 also includes an EVPN module 48 having flooding module 54 that performs flooding and a learning module 52 that performs layer two (L2) learning, e.g., learning of customer device MAC addresses from inbound PWs and association of those customer MAC addresses with corresponding outbound PWs and output interfaces. EVPN module 48 may maintain MAC tables 50 for each EVI established by PE router 10C, or in alternative examples may maintain one or more MAC tables that are independent of each respective EVI. Learning module 52 and flooding module 54 may alternatively reside within forwarding engine 45.

Signaling module 40 outputs control-plane messages to automatically establish LSPs, Ethernet Segments, and otherwise provision one or more EVPNs between PE router 10A and each of the other PE routers 10. Signaling module 40 may signal the PE routers 10 using one or more suitable L3 protocols, such as the BGP. Signaling module 40 can communicate with forwarding engine 30A to automatically update forwarding information 56.

EVPN module 48 executes in the control plane of PE router 10A and performs MAC address learning to automatically update portions of forwarding information 56 for each EVI established by PE router 10A. In some examples, EVPN module 48 is invoked when PE router 10A receives data packets on the LSPs established by router PE router 10A for one or more of the PE routers 10 that are members of an EVI. EVPN module 48 performs MAC address learning using learning module 52 and updates the one of MAC tables 50 to initially record associations between the PWs connected to PE router 10A and the source MAC addresses of the EVPN customer devices from which the data packets were received on the PWs. For example, the one of MAC tables 50 records PW numbers that identify the PWs connected to PE router 10A, and records MAC addresses that identify the source customer devices of the data packets transmitted over the PWs. In effect, router PE router 10A, an L3 routing device (or in some examples, an L2 switching device), learns associations between MAC addresses and LSPs (which are mapped to ports or interfaces), much as an L2 switch learns associations between MAC addresses and ports. Forwarding information 56 may represent a virtual port binding and bridging table.

In order to update the one of the MAC tables 50, learning module 52 of EVPN module 48 in routing engine 22 performs L2 learning and association of L2 customer MAC addresses with specific PWs. Learning module 52 then communicates information recorded in the one of MAC tables 50 to configure forwarding information 56. In this way, forwarding engine 30A may be programmed with associations between each PW and output interface and specific source customer MAC addresses reachable via those PWs. EVPN module 48 may communicate with forwarding engines 30 to update the one of MAC tables 50 associated with the EVPN to associate the customer MAC addresses with the appropriate outbound PW. In some examples, forwarding engine 30A may maintain local MAC tables (not shown). After the update, MAC tables 50 include associations between the PWs connected to PE router 10A that are used to transport L2 traffic to the MAC addresses of the customer devices. In other words, MAC tables 50 records associations between the PWs and the network devices to which data packets may be sent on the PWs. For example, MAC tables 50 may record PW numbers that identify the PWs sourced by PE router 10A, and for those PW numbers identifies the MAC addresses of the reachable customer devices.

Forwarding engine 30A receives data packets on inbound links 58 that are destined for one of the PE routers in the EVPN. Forwarding engine 30A determines whether the destination customer MAC address of the data packets is included in the one of MAC tables associated with the EVPN. If the MAC address is included in the one of MAC tables, then PE router 10A forwards the data packets to the destination PE router on the PW associated with the MAC address based on forwarding information 56 associated with the EVPN. If the customer MAC address is not included in the one of MAC tables, PE router 10A floods the data packets to all of the PE routers via the PWs based on forwarding information 56 associated with the EVPN. Example details of MAC learning by a router are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

In some examples, techniques of the present disclosure may be implemented in EVPN module 48. For instance, at initial configuration and startup, EVPN module 48 may initially generate an Ethernet AD route advertisement that indicates PE router 10A's reachability within Ethernet Segment 14 to customer network 6B. EVPN module 48 may generate an Ethernet AD route advertisement that indicates, among other information, an Ethernet segment identifier of Ethernet segment 14 and an MPLs label. The MPLS label may be a service label with information specific to an EVPN. In particular, this MPLS label included in the Ethernet AD route advertisement may be a service label as described in FIGS. 1-2 that a remote PE router, such as PE router 10C, uses as the inner label of a label stack in its forwarding next hops for routes corresponding to PE router 10A.

EVPN module 48 may send the generated Ethernet AD route advertisement to BGP 46. BGP 46 may generate a network packet formatted in accordance with the BGP protocol. BGP 46 may send the network packet to forwarding engine 30A, which in turn performs a lookup using forwarding information 56 based on the packet header of the network packet. Based on the lookup, forwarding engine 30A may cause the network packet to be forwarded out of one or more of interfaces 32A-32N. In the example of FIG. 3, forwarding engine 30A may cause the network packet that specifies the Ethernet AD route advertisement to be forwarded to PE router 10C as illustrated in FIG. 1.

PE router 10C receives the network packet and initially performs control plane processing on the network packet. In particular, PE router 10C determines the Ethernet segment identifier and MPLS label of the Ethernet AD route advertisement. PE router 10C updates its routing information to indicate that a route exists in Ethernet segment 14 to customer network 6B using PE router 10A. PE router 10C also configures it forwarding information to generate a label stack for PE router 10A that includes the MPLS label from the Ethernet AD route advertisement as the inner label and an MPLS LSP label that identifies PE router 10A in the MPLS core as the outer label. PE router 10C updates its forwarding next hops to associate the MPLS label stack with routes corresponding to PE router 10A.

At a later time, PE router 10A may receive a network packet from customer equipment 4C via CE router 8B. Forwarding engine 30A may initially receive the network packet, and upon performing a lookup based on the packet header, send the packet header information to EVPN module 48. Learning module 52 may update MAC tables 50 to store the MAC address of customer equipment 4C. Learning module 52 may also store other corresponding information in MAC tables 50, such as the Ethernet segment identifier for Ethernet segment 14 and ingress and/or egress interfaces for the network packet.

EVPN module 48 may also, generate a MAC route advertisement. The MAC route advertisement may include, among other information, the MAC address for customer equipment 4C and the Ethernet segment identifier for Ethernet segment 14. The MAC route advertisement may include an MPLS label that is an EVPN service label as described in FIGS. 1-2. In accordance with techniques of the disclosure, EVPN module 48 may include as the MPLS label in the MAC route advertisement, the same MPLS label that EVPN module 48 previously included in the Ethernet AD route advertisement that PE router 10A sent to PE router 10C. As further described below, because the MPLS label for the MAC route advertisement is same a previously used in the Ethernet AD route advertisement, the amount of control and/or plane processing at PE router 10C may be reduced.

Upon generating the MAC route advertisement information, EVPN module 48 may send the information to BGP 46. BGP 46 may generate a BPG formatted network packet that includes the MAC route advertisement information. BGP 46 may send the network packet to forwarding engine 30A, which in turn performs a lookup using forwarding information 56 based on the packet header of the network packet. Based on the lookup, forwarding engine 30A may cause the network packet to be forwarded out of one or more of interfaces 32A-32N. In the example of FIG. 3, forwarding engine 30A may cause the network packet that specifies the MAC route advertisement to be forwarded to PE router 10C as illustrated in FIG. 1.

PE router 10C receives the network packet and initially performs control plane processing on the network packet. In particular, PE router 10C determines the Ethernet segment identifier and MPLS label of the MAC route advertisement. PE router 10C may determine that the MPLS label of the MAC route advertisement is the same as the inner label of the label stack configured for the forwarding next hop that corresponds to Ethernet AD route previously configured by PE router 10C. Because the MPLS label of the MAC route advertisement is the same as the inner label already configured in the forwarding plane of PE router 10C for Ethernet segment 14, PE router 10C does not need to update its forwarding next hops in response to receiving the MAC route advertisement. Consequently, PE router 10C may not perform additional control and forwarding plane processing to update forwarding next hops in response to receiving the MAC route advertisement from PE router 10A.

In some examples, EVPN module 48 may implement one or more MAC route aging operations. The aging operations may determine the amount of time that has elapsed since a network packet for a MAC route was processed by PE router 10A. If the amount of time that has elapsed exceeds a threshold, EVPN module 48 may send a MAC route withdrawal message to PE router 10C to remove the MAC route from the forwarding information of PE router 10C. In accordance with techniques of the disclosure, responsive to determining that the amount of time for a MAC route that has elapsed satisfies a threshold (e.g., exceeds a threshold), EVPN module 48 may generate MAC route withdrawal advertisement including, among other information, the MAC address for the MAC route and the Ethernet segment identifier for the Ethernet segment corresponding to the MAC route. As further described below, by using the same MPLS label in both MAC route advertisements and Ethernet AD route advertisements, PE router 10C may not have to perform additional control and/or forwarding plane processing in response to receiving the MAC route withdrawal advertisement if PE router 10C has previously learned the same MAC address from PE router 10B beforehand.

Upon generating the MAC route withdrawal advertisement information, EVPN module 48 may send the information to BGP 46. BGP 46 may generate a BPG formatted network packet that includes the MAC route withdrawal advertisement information. BGP 46 may send the network packet to forwarding engine 30A, which in turn performs a lookup using forwarding information 56 based on the packet header of the network packet. Based on the lookup, forwarding engine 30A may cause the network packet to be forwarded out of one or more of interfaces 32A-32N. In the example of FIG. 3, forwarding engine 30A may cause the network packet that specifies the MAC route advertisement to be forwarded to PE router 10C as illustrated in FIG. 1.

PE router 10C receives the network packet and initially performs control plane processing on the network packet. In particular, PE router 10C determines the Ethernet segment identifier of the MAC route withdrawal advertisement. PE router 10C may determine that the MPLS label of the MAC route that corresponds to the MAC address in the original MAC route advertisement is the same as the inner label of the label stack configured for the forwarding next hop that corresponds to Ethernet AD route previously configured by PE router 10C for PE router 10A. Because the MPLS label of the MAC route advertisement and Ethernet AD route advertisement are the same as the inner label already configured in the forwarding plane of PE router 10C for Ethernet segment 14, PE router 10C does not need to update its forwarding next hops in response to receiving the MAC route withdrawal advertisement. Consequently, PE router 10C may not perform additional control and forwarding plane processing to update forwarding next hops in response to receiving the MAC route withdrawal advertisement from PE router 10A. Although techniques of the disclosure have between describe with respect to MAC aging, EVPN module 48 may perform similar operations in response to determining a link failure has occurred. In such examples, EVPN module 48 may send an Ethernet AD route withdrawal advertisement to PE router 10C. The Ethernet AD route withdrawal advertisement may not cause PE router 10C to perform additional control and forwarding plane processing because the MPLS label stack for forwarding next hops corresponding to MAC routes associated with the Ethernet segment specified in the Ethernet AD route withdrawal advertisement is the same. Because PE router 10C determines that the MPLS label for the initial Ethernet AD route advertisement is the same as the inner label of the MPLS label stack corresponding to forwarding next hops for MAC routes of Ethernet segment 14, PE router 10C does not need to update the label stack associated with the forwarding next hops. In this way, techniques of the disclosure may reduce the amount of control and/or forwarding plane processing that would otherwise occur at PE router 10C in response to receiving an Ethernet AD route withdrawal advertisement, because EVPN module 48 uses the same MPLS label for Ethernet AD route advertisements and MAC route advertisements.

The techniques described herein do not require modifications to BGP signaling for the EVPN. If a PE router configured as described herein encounters another PE router that does not support this feature, the configured PE router operates according to the conventional operation. The architecture of PE router 10C illustrated in FIG. 3 is shown for exemplary purposes only. The disclosure is not limited to this architecture. In other embodiments, PE router 10C may be configured in a variety of ways. In one embodiment, for example, some of the functionally of routing engine 22 and forwarding engines 30 may be distributed within IFCs 32.

Elements of control unit 20 may be implemented solely in software, or hardware, or may be implemented as combinations of software, hardware, or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 20 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of PE router 10C, e.g., protocols. Control unit 20, in some examples, retrieves and executes the instructions from memory for these aspects.

Figure 4:
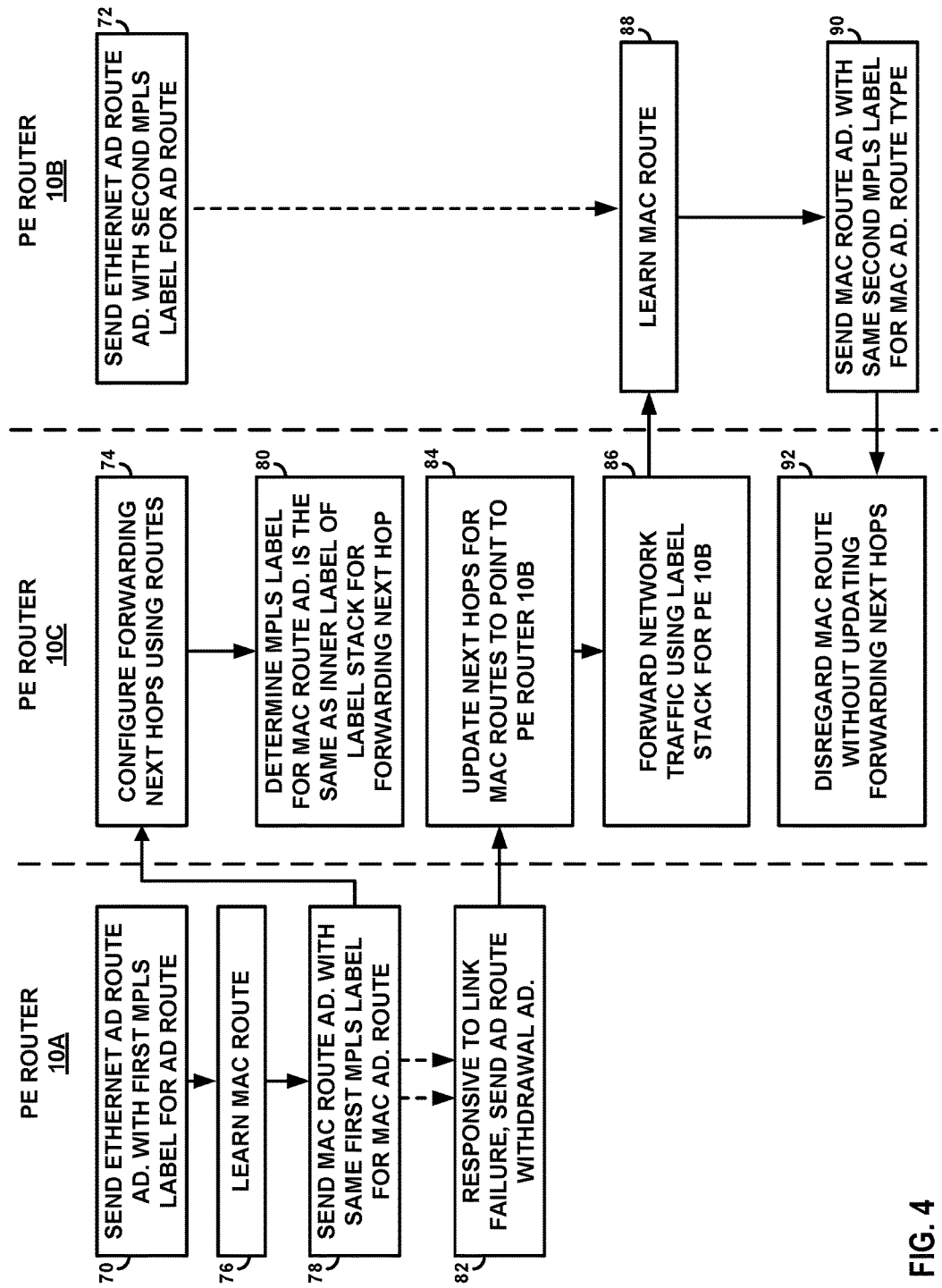
FIG. 4 is a flowchart illustrating example operations of an example system in which a first provider edge (PE) router uses a common L2 label for different EVPN route types to reduce forwarding plane reconfiguration at a second PE router, in accordance with techniques of the disclosure.

FIG. 4 is a flowchart illustrating example operations of an example system in which a first provider edge (PE) router uses a common L2 label for different EVPN route types to reduce forwarding plane reconfiguration at a second PE router, in accordance with techniques of the disclosure. Example operations in accordance with techniques of the disclosure are illustrated for example purposes with respect to PE router 10A, PE router 10B and PE router 10C. As shown in FIG. 4, PE router 10A, at initial configuration and startup, sends an Ethernet AD route advertisement that includes a first MPLS service label to PE router 10C (70). Similarly, PE router 10B may also send an Ethernet AD route advertisement that includes a second MPLS label that is different than the first MPLS label to PE router 10C (72).

In operation, PE router 10A receives network packets from CE router 8B and performs MAC learning, as described in FIGS. 1-3 (76). In response to learning a MAC route, PE router 10A may generate a MAC route advertisement that PE router 10A sends to PE router 10C (78). The MAC route advertisement may include, among other information, a MAC address of the customer equipment for the learned MAC route and the same first MPLS label that PE router 10A previously sent to PE router 10C in the Ethernet AD route advertisement.

If PE router 10A and 10B are configured in single-active mode, PE router 10C may generate a first forwarding next hop that indicates a first label stack for PE router 10A and a second forwarding next hop that indicates second label stack for PE router 10B (74). The first label stack may include an outer, transport MPLS label that indicates PE router 10A in the MPLS core of service provider network 12. PE router 10C may also determine, in accordance with techniques of the disclosure, that the MPLS tag included in the MAC route advertisement is the same as the inner, service MPLS label configured in the first label stack for the forwarding next hop corresponding to PE router 10A (80). Consequently, PE router 10C may not need to update its control and/or forwarding planes in response to receiving the MAC route advertisement. That is, the inner, service MPLS label may be the same as the first MPLS label that was included in the Ethernet AD route advertisement that PE router 10A sent to PE router 10C. The second label stack may include an outer, transport MPLS label that indicates PE router 10B in the MPLS core of service provider network 12. The inner, service MPLS label may include the second MPLS label that was included in the Ethernet AD route advertisement that PE router 10B sent to PE router 10C.

At a later time, PE router 10A may experience a link failure at network link 16G. Responsive to determining the link failure, PE router 10A may send an Ethernet AD route withdrawal advertisement to PE router 10C (82). In response to receiving the Ethernet AD route withdrawal advertisement, PE router 10C may determine that one or more MAC routes corresponding to the Ethernet segment indicated in the Ethernet AD route withdrawal advertisement are currently configured with label stacks that include inner, service labels that are the same as the initial inner, service MPLS label that PE router 10A included in the original Ethernet AD route advertisement that PE router 10A sent to PE router 10C. Therefore, PE router 10C, upon receiving the Ethernet AD route withdrawal advertisement from PE router 10A may update the forwarding next hops to use the second label stack for PE router 10B, but need not further update the inner, service MPLS label for the first label stack because the MPLS labels for MAC routes associated with PE router 10A and the MPLS label indicated in the initial Ethernet AD route are the same. (84)

PE router 10C, upon updating its forwarding next hops to use the second label stack for PE router 10B, may forward network packets to PE router 10B (86). Because PE router 10B is now operating as the designated forwarder due to PE router 10A experiencing a link failure and issuing an Ethernet AD route withdrawal advertisement, PE router 10B begins performing MAC learning as described in FIGS. 1-3 (88). Upon learning a MAC route, PE router 10B may send a MAC route advertisement to PE router 10C (90). The MAC route advertisement may include a MAC address for the customer equipment corresponding to the MAC route and the second MPLS label that is the same as the second MPLS label PE router 10B previously included in the Ethernet AD route advertisement that PE router 10B sent to PE router 10C. PE router 10C may receive the Ethernet AD route advertisement and determine that the MPLS label specified in the MAC route advertisement received from PE router 10B is the same as the second service MPLS label that PE router 10C previously configured as the inner, service MPLS label in the forwarding next hop for PE router 10B. Consequently, PE router 10C may not need to update its forwarding next hop for PE router 10C, that is, PE router 10C may not update inner, service MPLS label of the second label stack to the MPLS label included in the MAC route advertisement because the labels are the same (92).

Figure 5:
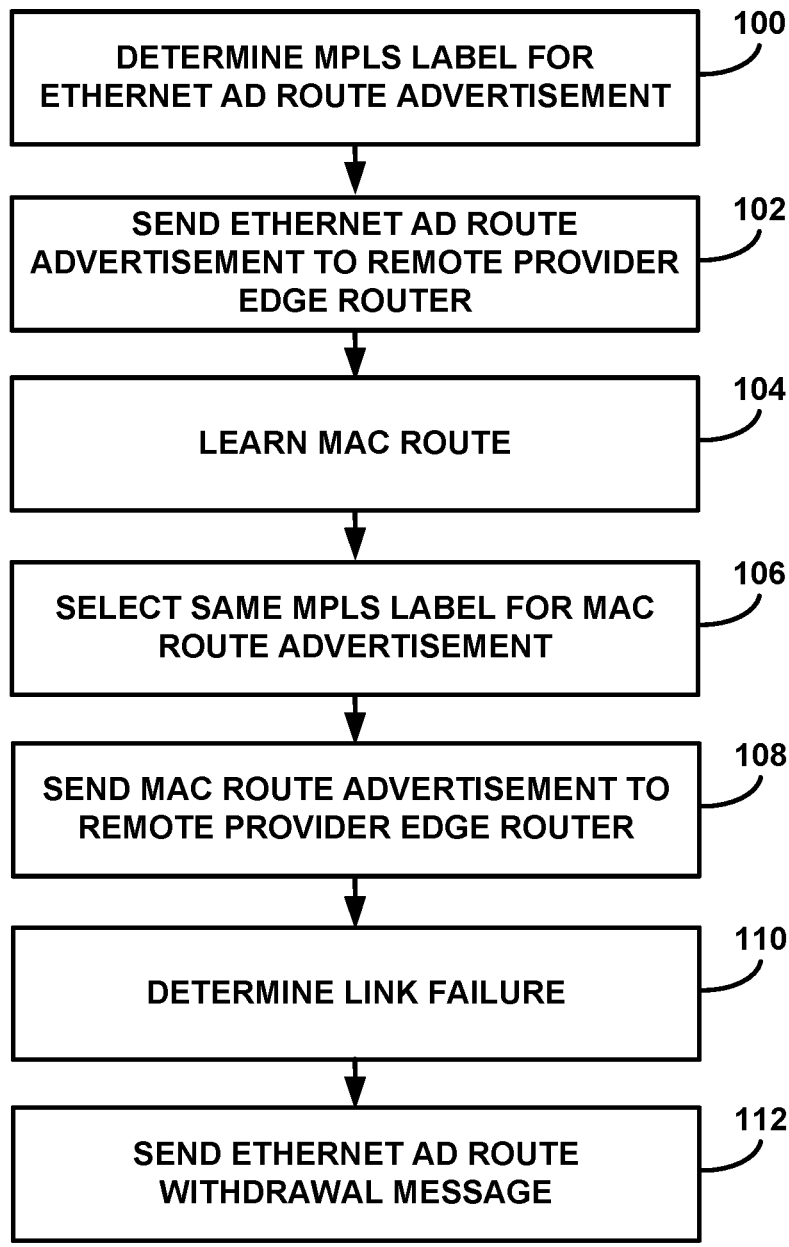
FIG. 5 is a flowchart illustrating example operations of a network device to receive designated forwarder information from multiple PE network devices and perform fast failover in response to a network failure, in accordance with techniques of the disclosure.

FIG. 5 is a flowchart illustrating example operations of a network device to use a common L2 label for different EVPN route types to reduce forwarding plane reconfiguration at a remote PE network device, in accordance with techniques of the disclosure. For purposes of illustration, the example operations are described below within the context of PE router 10A, as shown in FIGS. 1-3. Initially, during configuration and startup, PE router 10A may advertise its reachability in Ethernet segment 14 to remote PE router 10AC. PE router 10A may generate an Ethernet AD route advertisement that indicates its reachability. In some examples, PE router 10A determines an EVPN-specific MPLS service label to include in the Ethernet AD route advertisement (100). PE router 10A, upon generating the Ethernet AD route advertisement, which may include an Ethernet segment identifier of Ethernet segment 14 and the EVPN-specific MPLS service label, may send the Ethernet AD route advertisement to PE router 10C (102). PE router 10C may generate a forwarding next hop that indicates a label stack for PE router 10A. The label stack may include an outer, transport MPLS label that indicates PE router 10A in the MPLS core of service provider network 12. The inner, service MPLS label may include the first MPLS label that was included in the Ethernet AD route advertisement that PE router 10A sent to PE router 10C. As PE router 10C forwards next packets to customer network 6B using Ethernet segment 14, PE router 10C may apply the label stack to the network packets.

PE router 10A may later perform MAC learning to learn MAC routes as described in FIGS. 1-4. For instance, PE router 10A may receive a network packet from CE router 8B. Responsive to determining the MAC address indicated in the network packet, PE router 10A may advertise a MAC route that indicates the MAC address to PE router 10C. For instance, PE router 10A may select the same EVPN-specific MPLS service label that was included in the Ethernet AD route advertisement and include this label in a MAC route advertisement. The MAC route advertisement may further indicate, among other information, an Ethernet segment identifier of Ethernet segment 14 and the MAC address learned by PE router 10A. PE router 10A may send the MAC route advertisement to remote PE router 10C (108).

PE router 10C, upon receiving the MAC route advertisement, may determine that the MPLS label indicated in the advertisement is the same as the inner label of the label stack corresponding to the forwarding next hop for PE router 10A. Consequently, because the MPLS labels are the same, PE router 10C may not need to update the inner label of the MPLS label stack, thereby reducing the amount of routing and/or forwarding plane configuration at PE router 10C. As PE router 10C forwards network traffic corresponding to the MAC route to PE router 10A, PE router 10C may apply same label stack from the forwarding next hop that was initially configured in response to receiving the Ethernet AD route advertisement from PE router 10A.

At a later time, PE router 10A may determine that a link failure has occurred at network link 16G (112). Responsive to determining the link failure, PE router 10A may send an Ethernet AD route withdrawal advertisement to PE router 10C (112). PE router 10C may receive the Ethernet AD route withdrawal advertisement. Because the MPLS label for the initial Ethernet AD route advertisement is the same as the MPLS label for the MAC route advertisement, PE router 10C does not need to update the inner label of the label stack that corresponds to the forwarding next hop for PE router 10A to withdraw the MAC routes associated with PE router 10A in the Ethernet segment. In some examples, PE router 10C may update its forwarding information to use, for example, a different PE router in Ethernet segment 14, such as PE router 10B as the designated forwarder for network traffic destined to customer network 6B via Ethernet segment 14.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media. In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

What is claimed is:

1. A method comprising:
    sending, by a first provider edge (PE) network device that is configured in a layer two (L2) segment of an Ethernet Virtual Private Network (EVPN) and to a second PE network device, a first layer three (L3) control plane message that includes a label-switched network protocol label that corresponds to a first EVPN route type, wherein the first L3 control plane message indicates that the first PE network device is reachable in the L2 segment;
    receiving, by the first PE network device, a network packet and performing L2 address learning to determine, from the packet, an L2 address associated with the layer two segment of the EVPN; and
    responsive to determining the at least one L2 address,
        selecting, by the first PE network device, the L2 label-switched network protocol label that corresponds to the first EVPN route type;
        generating, by the first PE network device, a second L3 control plane message that corresponds to a different EVPN route type, the second L3 control plane message including the L2 address and the same label-switched network protocol label that corresponds to the first EVPN route type of the first L3 control plane message; and
        sending, by the first PE network device and to the second PE network device, the second L3 control plane message, wherein the second L3 control plane message indicates that the L2 address is reachable in the L2 segment through the first PE network device.

2. The method of claim 1, further comprising:
    receiving, from the first provider edge (PE) network device that is configured in the L2 segment of the Ethernet Virtual Private Network (EVPN) and by the second PE network device, the first L3 control plane message that includes the label-switched network protocol label corresponding to a first EVPN route type;
    configuring, by the second PE network device, a label stack for a forwarding next hop that indicates the first PE router, the label stack including:
        a service label that comprises the label-switched network protocol label corresponding to the first EVPN route type, and
        a transport label that identifies the first PE network device in a Multi-Protocol Label Switching (MPLS) core of the EVPN;
    responsive to applying the label stack to network packets, forwarding, by the second PE network device, the network packets to the first PE network device;
    receiving, by the second PE network device and from the first PE network device, the second L3 control plane message; and
    responsive to determining that the label-switched network protocol label included in the second L3 control plane message is the same as the service label of the label stack for the forwarding next hop that indicates the first PE router, processing, by the second PE network device, a MAC route without updating the service label of the label stack.

3. A network device that is a first provider edge (PE) network device, wherein the first PE network device is configured in a layer two (L2) segment of an Ethernet Virtual Private Network (EVPN), the first PE network device comprising:
    an Ethernet Virtual Private Network (EVPN) module that sends to a second PE network device, a first layer three (L3) control plane message that includes a label-switched network protocol label that corresponds to a first EVPN route type, wherein the first L3 control plane message indicates that the first PE network device is reachable in the L2 segment;
    a network interface that receives a network packet;
    wherein the EVPN module performs L2 address learning to determine, from the packet, an L2 address associated with the layer two segment of the EVPN; and
    wherein the EVPN module, responsive to determining the L2 address, selects the label-switched network protocol label that corresponds to the first EVPN route type of the first L3 control plane message, generates a second L3 control plane message that includes the L2 address and the same label-switched network protocol label included in the first L3 control plane message, and sends the second L3 control plane message to the second PE network device, wherein the second L3 control plane message indicates that the label-switched network protocol label corresponds to a second EVPN route type and that the L2 address is reachable in the L2 segment through the first PE network device.

* * * * *